United States Patent Office 3,519,582
Patented July 7, 1970

3,519,582
EPOXIDE RESIN COMPOSITIONS
Peter Clelford, Saffron Walden, John Michael Cou'ter, Giltbrook, and Georg Sigfrid Neumann, Duxford, Cambridge, England, assignors to Ciba Limited, Basel, Switzerland, a company of Switzerland
No Drawing. Filed Oct. 18, 1967, Ser. No. 676,080
Claims priority, application Great Britain, Oct. 27, 1966, 48,258/66
Int. Cl. C08g 30/14
U.S. Cl. 260—18                10 Claims

ABSTRACT OF THE DISCLOSURE

A hardenable composition of matter comprising an epoxide resin, and, as hardener therefor, an aliphatic polyamine containing at least three nitrogen atoms, and directly attached to said nitrogen atoms, at least three hydrogen atoms and at least one member selected from the group consisting of benzyl group, α-phenylethyl group, benzyl group substituted by halogen in the phenyl nucleus, benzyl group substituted in phenyl nucleus by alkyl group containing at most two carbon atoms, α-phenylethyl group substituted by halogen in the phenyl nucleus and α-phenylethyl group substituted in phenyl nucleus by alkyl group containing at most two carbon atoms.

---

This invention relates to hardenable epoxide resin compositions and to products obtained by hardening such compositions.

Aliphatic polyamines have acquired considerable importance as hardeners, i.e. curing agents, for epoxide resins. Those commonly employed, particularly the polyalkylene polyamines such as diethylenetriamine, are normally liquid at room temperature and mix readily with epoxide resins. In the curing reaction between these amines and resins, external application of heat is usually unnecessary. However, they have certain shortcomings. Many have high vapour pressures at room temperature and so are objectionable to handle; they are also hygroscopic. A particularly disadvantageous consequence of their sensitivity to moisture is that surfaces of epoxide resin compositions containing conventional aliphatic polyamine hardeners become cloudy, i.e. "blush" or "bloom," under normal conditions of humidity; this detraction from their appearance is particularly important when the compositions are used as coatings and castings.

Adducts of epoxide resins with a stoichiometric excess of an aliphatic polyamine have also been used as curing agents. While these show a reduced tendency to blush, the adducts are generally inconvenient to use, unless a solvent be added, because of their high viscosity. The need to use a solvent restricts the scope of application of the resin-hardener mixtures. Polyamines wherein the amino groups are directly attached to cycloaliphatic nuclei also have a reduced tendency to cause blushing. But they are less reactive toward epoxide resins than are the polyalkylene polyamines commonly employed, and are usually more expensive. Another drawback is that they are often solid at room temperature and so are less readily mixed with the epoxide resin. Polyamines wherein the amino groups are directly attached to aromatic nuclei, although little prone to induce blushing are, nevertheless, not always suitable since they usually give discoloured cured products.

It has now been found that, by the use of certain N-aralkylated aliphatic polyamines, these disadvantages can be mitigated or substantially overcome. Also, mixtures of epoxide resins with these amines have longer pot lives than have those containing the unmodified corresponding alkylenepolyamine.

The present invention accordingly provides hardenable compositions comprising an epoxide resin, and, as hardener therefor, an aliphatic polyamine containing at least three nitrogen atoms, and directly attached to said nitrogen atoms, at least three hydrogen atoms and at least one benzyl group or α-phenylethyl group in which groups the phenyl nucleus may be substituted by halogen or an alkyl group containing not more than two carbon atoms.

A preferred group of derivatives of aliphatic polyamines are those which contain at least four hydrogen atoms directly attached to nitrogen, especially the compounds of the general formula

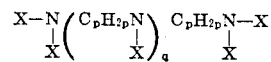

where $p$ is 2 or 3, $q$ is an integer of value at least 1 but not more than 5, and each X denotes a hydrogen atom, an alkyl group, a hydroxyalkyl group, such as 2-hydroxyethyl or 2-hydroxypropyl, a cyanoalkyl group, such as 2-cyanoethyl, or a benzyl group or α-phenylethyl (i.e. α-methyl-benzyl) group as previously defined, the nature of each X and the value of $q$ being such that the compound contains directly attached to the indicated nitrogen atoms at least one benzyl or α-phenylethyl group and at least four hydrogen atoms.

Further preferred are those compounds of the general formula

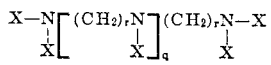

where $r$ is 2 or 3, and $q$ and X have the meanings previously assigned, the nature of each X and the value of $q$ being such that the compound contains, directly attached to the indicated nitrogen atoms, at least one benzyl or α-phenylethyl group and at least four hydrogen atoms.

Yet further preferred are those of the general formula

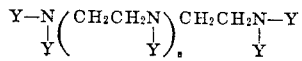

where $s$ is 2 or 3, and Y denotes a hydrogen atom or a benzyl or α-phenylethyl group as previously defined, at least one, but not more than two, Y's denoting a said benzyl or a α-phenylethyl group.

Also suitable as hardeners are derivatives of the aforesaid aliphatic polyamines further containing, directly attached to nitrogen, an acyl residue of an aliphatic or cycloaliphatic carboxylic acid. Preferred such hardeners are those which are of the general formula

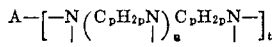

where $t$ is 1, 2 or 3, A denotes an acyl residue formed by removing $t$ hydroxyl groups of an aliphatic or cycloaliphatic acid having originally $t$ carboxylic acid groups, $u$ is an integer of value at least one but not more than 5, and, of the indicated free valencies of the nitrogen atoms, other than those directly attached to the said acyl residue, at least three are satisfied by hydrogen atoms and at least one by a benzyl or α-phenylethyl group as previously defined. When $t$ is 1, A preferably denotes an acyl residue of a long-chain unsaturated fatty acid, especially one containing a chain of at least 12 carbon atoms, such as oleic or ricinoleic acid. When $t$ is 2 or 3, A preferably denotes an acyl residue of a dimerised or trimerised long-chain unsaturated fatty acid, especially a dimer or trimer of a polyunsaturated fatty acid containing a chain of at least 12 carbon atoms, such as linoleic acid.

The most preferred hardeners are those containing an unsubstituted benzyl or α-phenylethyl group, especially N-benzyltriethylenetetramine and tetraethylenepentamine in which two amino hydrogens have been replaced by benzyl groups.

The new hardeners where X or Y denotes a benzyl or substituted benzyl group are obtainable by reaction between an aliphatic polyamine and an appropriate quantity of the benzyl chloride or bromide, suitably by heating the two together, followed by liberation of the base by treatment with alkali. Any unreacted amine may be removed, suitably by distillation, leaving the higher-boiling N-benzylated polyamine as a residue. The hardeners containing an α-phenylethyl or substituted α-phenylethyl group are suitably prepared in a similar manner from the appropriate α-phenylethyl chloride or bromide.

Those hardeners which further contain, directly attached to nitrogen, an acyl residue of an aliphatic or cycloaliphatic carboxylic acid, i.e. poly(amino)amides, may be prepared by reaction of a suitably N-aralkylated aliphatic polyamine with the acid or an amide-forming derivative thereof such as a lower alkyl ester.

The hardeners of the present invention have lower vapour pressures than do the corresponding unsubstituted polyamides from which they may be made and are therefore less objectionable to use. Furthermore, they are less hygroscopic, and thus the degree of objectionable "blushing" which occurs at surfaces of epoxy resin/amine hardeners system exposed to atmospheric moisture is much less pronounced, or even absent.

The proportions of the hardeners of the present invention to be used may vary within certain limits, depending on whether other hardening agents are present in the hardenable compositions. The optimum amount may readily be found by routine experimentation in a known manner; ordinarily, however, the amount of hardener will be such as to provide about 0.8 to 1.1 amino-hydrogen equivalents per epoxide equivalent of the resin.

The epoxide resins used in this invention are those hardenable by polyamines; they have an epoxy equivalency greater than 1.0. The "epoxy equivalency" is the average number of epoxy groups:

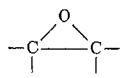

per molecule in the epoxide resin. Because of the usual methods of preparation of epoxide resins, and because they are usually mixtures of compounds having different molecular weights and contain some compounds in which the terminal epoxy groups have been hydrolysed, the epoxy equivalency of a polyepoxide compound is not necessarily a whole number of at least 2, but in all cases it is greater than 1.0. The epoxy resins are suitably those wherein the 1,2-epoxide groups are terminal, i.e. are of the formula

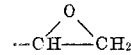

especially those wherein the 1,2-epoxide groups are glycidyl ether or glycidyl ester groups. Desirable the epoxy resins contain at least 1 epoxy equivalent per kilogram.

Epoxy resins which may be used in these compositions include, for example, polyglycidyl esters, such as those obtainable by the reaction of a polycarboxylic acid with epichlorohydrin or glycerol dichlorohydrin in the presence of an alkali. Such polyglycidyl esters may be derived from aliphatic dicarboxylic acids, such as oxalic acid, succinic acid, glutaric acid, adipic acid, pimelic acid, suberic acid, azelaic acid, sebacic acid, or dimerised or trimerised unsaturated fatty acids such as di- or trimerised linoleic acid; from aromatic dicarboxylic acids, such as phthalic acid, isophthalic acid, terephthalic acid, naphthalene - 2,6 - dicarboxylic acid, diphenyl-o,o'-dicarboxylic acid and ethylene glycol bis (p-carboxyphenyl) ether; and from cycloaliphatic dicarboxylic acids such as tetrahydrophthalic acid and hexahydrophthalic acid.

Other epoxy resins which may be used include, for example, those wherein the 1,2-epoxide groups are directly attached to nitrogen, for example, N,N-diglycidylaniline, N,N,N',N' - tetrakis-(glycidyl) - 4,4'-diaminodiphenylmethane, N,N' - diglycidyl - 5,5-dimethylhydantin, triglycidyl isocyanurate, and also polyglycidyl ethers, such as those obtainable by the interaction of a polyhydric alcohol or a polyhydric phenol with epichlorohydrin or glycerol dichlorohydrin under alkaline conditions, or alternatively, in the presence of an acidic catalyst with subsequent treatment with alkali. These compounds may be derived from alcohols such as ethylene glycol, diethylene glycol, triethylene glycol, propane-1,2-diol, propane-1,3-diol, butane-1,4-diol, pentane-1,5-diol, hexane-1,6-diol, quinitol, resorcitol, hexane-2,4,6-triol, glycerol, pentaerythritol, and N-polyhydroxyalkylated derivatives of aromatic amines, such as N - phenyldiethanolamine, and from mononuclear or polynuclear polyhydric phenols such as resorcinol, cathecol, hydroquinone, 1,5-dihydroxynaphthalene, 1,4 - dihydroxynaphthalene, bis (4-hydroxyphenyl) methane, bis(4 - hydroxyphenyl)methylphenylmethane, bis(4 - hydroxyphenyl)tolylmethanes, 4,4' - dihydroxydiphenyl, bis(4-hydroxyphenyl)sulphone, phenol - aldehyde condensation products and, especially, 2,2-bis(4 - hydroxyphenyl)propane. Specific polyglycidyl ethers are ethylene glycol diglycidyl ethers, resorcinol diglycidyl ethers and glycidyl ethers of phenol-formaldehyde novolaks.

Especially suitable are polyglycidyl ethers of 2,2-bis-(4 - hydroxyphenyl)propane having an epoxy content of from about 3.8 to 5.88 equivalents per kilogram.

The compositions of the invention may also contain accelerators for the hardening action, especially phenols such as phenol itself and 2,4,6-tris(dimethylaminomethyl)phenol. They may also contain colouring agents, plasticisers such as dibutyl phthalate, and fillers, for example asphalt, bitumen, glass fibres, mica, quartz powder, cellulose, kaolin, finely-divided silica such as that available under the registered trademark "Aerosil," or metal powder. They may be used in the filled or unfilled state, as such or in the form of solutions or emulsions, as laminating resins, varnishes and lacquers, dipping resins, casting resins, moulding compositions, and encapsulating, coating, filling and packing materials, and adhesives, as well as for the preparation of such materials.

The following examples illustrate the invention. Unless otherwise specified, the parts are by weight.

The hardeners used in the examples were prepared as follows:

Hardener A

A solution of tetraethylenepentamine (35.4 g., 0.187 mol) in toluene( 50 ml.) was heated on a steam-bath in an atmosphere of nitrogen. To the stirred solution was added dropwise over half an hour benzyl chloride (47.6 g., 0.374 mol), the amine hydrochloride separating out as the lower layer. Stirring and heating were continued for a further 30 minutes, and the mixture was then allowed to cool to room temperature. The mixture was shaken with 50% w./w. aqueous sodium hydroxide solution (40 ml.), and the organic layer was separated off. The aqueous mixture was extracted with toluene (3× 30 ml.), the toluene extracts were combined with the organic layer, and the toluene and water were distilled off by heating on a boiling water bath at 12–15 mm. Hg pressure. The liquid residue, which did not fume in moist air, contained, per average molecule, two N-benzyl groups and five hydrogen atoms directly attached to nitrogen: it weighed 61 g., corresponding to an 89% yield.

Hardener B

A solution of triethylenetetramine (146 g., 1 mol) in toluene (250 ml.) was similarly treated with benzyl chloride (127 g., 1 mol), the addition taking 45 minutes. The product was treated with 100 ml. of 50% w./w. aqueous sodium hydroxide solution, and the aqueous portion extracted with 3× 30 ml. portions of toluene. There was obtained 185 g. (78% yield) of a high-boiling liquid which, unlike triethylenetetramine, did not fume in moist air, and contained per average molecule one N-benzyl group and five hydrogen atoms directly attached to nitrogen.

Hardener C

This consisted of the N-benzyl-dipropylenetriamine of formula

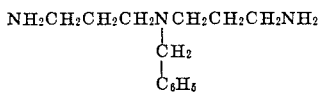

and was prepared as follows. Acrylonitrile (318 g., 6.0 mols), benzylamine (214 g., 2.0 mols) and glacial acetic acid (10 g.) were stirred together under reflux for 17½ hours. Excess acrylonitrile and acetic acid were removed by distillation at temperatures up to 105° C., under a vacuum of 25 mm. Hg. The product was a yellow mobile liquid. A sample (213 g., 1 mol) was treated with hydrogen in liquid ammonia (170 g.) at temperatures up to 130° C. and pressures up to 105 atmospheres in the presence of Raney nickel Catalyst W-7 (20 g.) until hydrogen was no longer taken up. Ethanol (350 g.) was added to the mixture, which was filtered and distilled in vacuo, the water-white fraction boiling at 140°–150° C./0.1 mm. Hg being collected. This fraction had a nitrogen content of 18.4% (theoretical value, 19%).

Hardener D

This is an N-α-phenylethyl-triethylenetetramine, prepared as follows. Hydrogen chloride was bubbled into a mixture of styrene (104 g., 1 mol), toluene (100 ml.) and concentrated hydrochloric acid (S.G. 1.17, 100 ml.) at 30–40° C. for 8 hours. The toluene layer was separated, and washed with distilled water until the washings were chloride-free. Distillation in vacuo afforded α-phenylethyl chloride as a liquid with boiling point 43° C./0.5 mm. Hg.

α-Phenylethyl chloride (25 g., 0.18 mol) was added dropwise over 1 hour to triethylenetetramine (43.3 g., 0.3 mol) in methanol (54 ml.). After being heated to reflux for 30 minutes and then cooled to room temperature, the mixture was stirred for 30 minutes with sodium hydroxide (8 g., 0.2 mol) in water (8 ml.). Methanol and water were distilled off, the residue treated with 1 g. of "Dicalite 4200" (a diatomite filter-aid available from The Dicalite Company), and filtered. Unreacted triethylenetetramine was distilled off under vacuum. The residue had a nitrogen content of 19.3% indicating it to contain, per average molecule, 1.4 α-phenylethyl groups and 4.6 hydrogen atoms directly attached to nitrogen.

Hardener E

This is an N-benzyl-poly(aminoamide), prepared as follows. Benzyl chloride (126.5 g., 1 mol) was added dropwise in a nitrogen atmosphere over 2 hours with stirring to tetraethylenepentamine (189 g., 1 mol) in methanol (250 ml.) held at 60° C. The mixture was heated to reflux for 2 hours, cooled to room temperature, and stirred with sodium hydroxide (44 g., 1.1 mol) in water (44 ml.). The mixture was filtered and methanol and most of the water were removed by vacuum distillation. Toluene (150 ml.) was added, the solution filtered and the toluene and traces of water were removed by vacuum distillation. The residue was filtered through 2 g. of "Dicalite 4200" to give a clear, light amber liquid. This N-benzylated tetraethylenepentamine (189 g.) and "Empol 1014 Dimer Acid" (177 g., 0.62 carboxyl equiv.) were heated together at 200° C., first under nitrogen for 2 hours and then under a vacuum of about 120 mm. Hg for 2 hours, the water formed being distilled off. The residue, a yellow viscous resin, weighed 344 g.

"Empol 1014 Dimer Acid" is derived from unsaturated fatty acids, essentially linoleic acid, and contains about 95% dimerised acid, 4% trimerised acid and 1% monomeric acid: it was obtained from Unilever-Emery N.V., Gouda, Netherlands.

Hardener F

This non-benzylated poly(aminoamide) was prepared for purposes of comparison from tetraethylenepentamine (189 g., 1 mol) and "Empol 1014" (287 g., 1.0 carboxyl equiv.). The yield was 441 g.

Hardener G

A solution of triethylenetetramine (18.32 kg., 125.4 mols) in toluene was heated to 80° C. in an atmosphere of nitrogen. Benzyl chloride (15.95 kg., 125.8 mols) was added to the stirred solution over 2 hours. Stirring at 80° C. was continued for a further hour, and the mixture was cooled to room temperature. A solution of caustic soda (13.00 kg., 325.0 mols) in water (34.00 kg.) was stirred into the mixture, the aqueous layer discarded, and toluene was distilled off at temperatures up to 80° C. at 11 mm. The product was a clear, yellow, mobile liquid which weighed 20.36 kg., corresponding to a 69% yield. A sample (2.77 kg.) was distilled in vacuo, the fraction boiling at 170–180° C./0.25 mm. Hg being collected. This fraction, which weighed 1.89 kg., had a nitrogen content of 18.4%, corresponding to 1.8 benzyl groups and 4.2 amino-hydrogen atoms per average molecule.

EXAMPLES 1–3

The epoxy resin employed (hereinafter designated "Epoxy resin I") was prepared in a known manner by the reaction of 2,2 - bis(4-hydroxyphenyl)propane with epichlorohydrin in the presence of alkali; it had an epoxide content of 5.1 equiv./kg. and a viscosity of 275 poises at 21° C.

Samples of the resin were mixed at room temperature (i.e. at about 20° C.) with aliphatic polyamines in proportions such as to afford 1 amino-hydrogen equivalent per epoxide equivalent, and then cast in the form of a film about 0.1 mm. thick. The composition of the resin-hardener mixtures, the appearance of the films under various conditions of temperature and relative humidity (R.H.), and the mechanical properties of these films after having been allowed to cure for 7 days at a relative humidity of about 60% and at room temperature (about 20° C.) are shown in Table 1. The times taken for the films to gel and harden were determined by means of a Beck Koller Drying Recorder.

TABLE I

| Example No. | Composition Component | Parts | Appearance and curing properties of film | | | Properties of film after 7 days cure at about 20° C. and 60% R.H. | |
|---|---|---|---|---|---|---|---|
| | | | R.H. about 60% at about 20° C. | R.H. 90% at about 20° C. | R.H. 90% at 5° C. | Erichsen distensibility (mm.) | König hardness (sec.) |
| 1 | Epoxy resin I | 100 | Clear; hard after 12 hours. | Clear; hard after 18 hours. | Clear; hard after 4 days. | 0.4 | 246 |
| | Hardener A | 40 | | | | | |
| | Epoxy resin I | 100 | Blushed badly; hard after 7 hours. | Blushed badly; hard after 10 hours. | Blushed badly; hard after 4 days. | | |
| | Tetraethylenepentamine. | 15 | | | | | |
| 2 | Epoxy resin I | 100 | Clear; hard after 20 hours. | Clear; hard after 24 hours. | Clear; gelled after 5 days. | 0.3 | 117 |
| | Hardener B | 25 | | | | | |
| | Epoxy resin I | 100 | Blushed badly; hard after 14 hours. | Blushed badly; hard after 20 hours. | Blushed badly; gelled after 3 days. | | |
| | Triethylenetetramine. | 12 | | | | | |
| 3 | Epoxy resin I | 100 | Clear; hard after 16 hours. | Clear; hard after 20 hours. | Clear; gelled after 4 days. | 0.3 | 136 |
| | Hardener B | 25 | | | | | |
| | Phenol | 5 | | | | | |

It will be seen that compositions containing conventional hardening agents showed severe blushing, while those containing the hardening agents of the present invention did not.

EXAMPLES 4–8

The epoxide resins employed were one (hereinafter designated "Epoxy resin II") similar to Epoxy Resin I but having an epoxide content of 5.2 equiv./kg. and a viscosity of 234 poises at 21° C., and diglycidyl hexahydrophthalate ("Epoxy resin III") having an epoxide content of 6.34 equiv./kg.

Films were prepared as described in Examples 1–3, the amounts of polyamine being such as to provide one amino-hydrogen equivalent per epoxide equivalent. The composition of the resin-hardener mixtures and the appearance of the film under various conditions of relative humidity at about 20° C. are shown in Table II.

TABLE II

| Example No. | Composition Component | Parts | Appearance and curing properties of film | | | |
|---|---|---|---|---|---|---|
| | | | R.H. 66% | R.H. 81% | R.H. 93% | R.H. 98% |
| 4 | Epoxy resin II | 100 | Clear, hard | Clear, hard | Slight blushing, hard. | Moderate blushing, hard. |
| | Hardener C | 28.7 | | | | |
| | Epoxy resin II | 100 | Blushed badly | Blushed badly | Blushed badly | Blushed badly. |
| | Dipropylenetriamine | 13.6 | | | | |
| 5 | Epoxy resin II | 100 | Clear, hard | Clear, hard | Slight blushing, hard. | Moderate blushing, hard. |
| | Hardener D | 35 | | | | |
| 6 | Epoxy resin II | 100 | Clear, hard | Clear, hard | Clear hard | Clear, hard. |
| | Hardener G | 38.4 | | | | |
| | Epoxy resin II | 100 | Blushed badly | Blushed badly | Blushed badly | Blushed badly. |
| | Triethylenetetramine | 12.6 | | | | |
| 7 | Epoxy resin II | 100 | Clear, hard | Clear, hard | Clear, hard | Clear, hard |
| | Hardener E | 80.8 | | | | |
| | Epoxy resin II | 100 | Blushed badly | Blushed badly | Blushed badly | Blushed badly. |
| | Hardener F | 45.9 | | | | |
| 8 | Epoxy resin III | 100 | Clear, hard | Clear, hard | Clear, hard | Clear, hard. |
| | Hardener G | 46.7 | | | | |
| | Epoxy resin III | 100 | Blushed badly | Blushed badly | Blushed badly | Blushed badly. |
| | Dipropylenetriamine | 16.7 | | | | |
| | Epoxy resin II | 100 | Blushed badly | Blushed badly | Blushed badly | Blushed badly. |
| | Diethylenetriamine | 13 | | | | |
| | Epoxy resin III | 100 | Blushed badly | Blushed badly | Blushed badly | Blushed badly. |
| | Triethylenetetramine | 15.4 | | | | |

EXAMPLE 9

Mixtures, each of 40 g. and having the composition given in Table III, were stored at 21° C. and the pot-lives compared using as basis the "gelation time" as measured by a Techne gelation timer.

TABLE III

| Composition Component | Parts | Gelation time (minutes) |
|---|---|---|
| Epoxy resin II | 100 | 195 |
| Hardener G | 38.4 | |
| Epoxy resin II | 100 | 60 |
| Triethylenetetramine | 12.6 | |

The composition of the present invention had a considerably longer pot-life than one containing an unmodified alkylenepolyamine. The former gelled composition was heated for 4 hours at 100° C., and the cured product had a heat deflection temperature, determined according to British Standards Specification 2782, 102G, of 83° C.

We claim:
1. A hardenable composition of matter comprising an epoxide resin, and, as hardener therefor, an aliphatic polyamine of the general formula

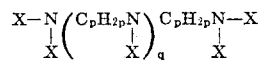

where $p$ is an integer of at least 2 and at most 3, $q$ is an integer of value at least 1 and at most 5, and each X denotes a member selected from the group consisting of hydrogen atom, alkyl group, hydroxyalkyl group, cyanoalkyl group, benzyl group and α-phenylethyl group, the nature of each X and the value of $q$ being such that the hardener compound contains directly attached to the indicated nitrogen atoms at least three hydrogen atoms and at least one member selected from the group consisting of benzyl and α-phenylethyl group.

2. A composition according to claim 1, wherein the hardener is of the general formula

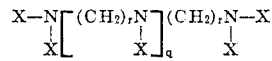

where $r$ is an integer of at least 2 and at most 3, and $q$ and X have the meanings defined in claim 1, the nature of each X and the value of $q$ being such that the hardener contains, directly attached to the indicated nitrogen atoms, at least three hydrogen atoms and at least one member selected from the group consisting of benzyl and α-phenylethyl group.

3. A composition according to claim 1, wherein the hardener is of the general formula

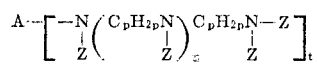

where $t$ is an integer of at least 1 and at most 3. A denotes the acyl residue formed by removing $t$ hydroxyl groups from a member selected from the group consisting of aliphatic and cycloaliphatic acid having originally $t$ carboxylic acid groups, $u$ is an integer of value at least one and at most 5, and Z denotes a member selected from the group consisting of hydrogen atom and benzyl and α-phenylethyl group, at least three Z's each denoting a hydrogen atom and at least one Z denoting a member selected from the group consisting of benzyl and α-phenylethyl group.

4. A composition according to claim 3, wherein $t$ is 1 and A denotes the acyl residue of a long-chain unsaturated fatty acid containing a chain of at least 12 carbon atoms.

5. A composition according to claim 3, wherein $t$ is an integer of at least 2 and at most 3, and A denotes the acyl residue of a member selected from the group consisting of a dimer of a polyunsaturated fatty acid containing a chain of at least 12 carbon atoms and a trimer of a polyunsaturated fatty acid containing a chain of at least 12 carbon atoms.

6. A composition according to claim 2, wherein the hardener is of the general formula

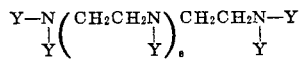

where $s$ is an integer of at least 2 and at most 3, and Y denotes a member selected from the group consisting of hydrogen atom, benzyl group and α-phenylethyl group, at least one, but not more than two, Y's denoting a member selected from the group consisting of benzyl and α-phenylethyl group.

7. A composition according to claim 1, wherein the hardener is N-benzyltriethylenetetramine.

8. A composition according to claim 1, wherein the hardener is a tetraethylenepentamine in which two amino hydrogens have been replaced by benzyl groups.

9. A composition according to claim 1, wherein the epoxide groups of the epoxide resin occur in a radical selected from the group consisting of glycidyl ester group and glycidyl ether group.

10. A composition according to claim 1, wherein the amount of hardener is such as to provide 0.8 to 1.1 equivalents of active hydrogen attached to amino nitrogen per epoxide equivalent of the epoxide resin.

References Cited

UNITED STATES PATENTS

| | | | |
|---|---|---|---|
| 3,331,788 | 7/1967 | Lorensen et al. | 260—2 |
| 3,048,620 | 8/1962 | Spivak | 260—2 X |

DONALD E. CZAJA, Primary Examiner

C. W. IVY, Assistant Examiner

U.S. Cl. X.R.

260—2, 47, 830